United States Patent
Ran et al.

(10) Patent No.: US 11,972,330 B2
(45) Date of Patent: Apr. 30, 2024

(54) CAPTURING AND QUANTIFYING LOOP DRIVE BALL METRICS

(71) Applicant: International Business Machines Corporation, Armonk, NY (US)

(72) Inventors: Chuan Ran, Morrisville, NC (US); Junhui Wang, Cary, NC (US); Guandong Zhu, Raleigh, NC (US); Yongchang Cui, Cary, NC (US); Shuyan Lu, Cary, NC (US); Yang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 17/038,594

(22) Filed: Sep. 30, 2020

(65) Prior Publication Data
US 2022/0101158 A1 Mar. 31, 2022

(51) Int. Cl.
G06N 20/00 (2019.01)
G06V 20/40 (2022.01)

(52) U.S. Cl.
CPC ............. *G06N 20/00* (2019.01); *G06V 20/42* (2022.01); *G06V 20/46* (2022.01)

(58) Field of Classification Search
CPC ......... G06N 20/00; G06V 20/46; G06V 20/42
See application file for complete search history.

(56) References Cited

U.S. PATENT DOCUMENTS

| 6,126,449 A | 10/2000 | Burns |
| 8,025,560 B2 | 9/2011 | Ikejiri |
| 8,251,789 B2 | 8/2012 | Ikejiri |
| 10,112,076 B2 | 10/2018 | Decarlo |
| 10,668,353 B2 | 6/2020 | Mettler May |
| 2005/0153785 A1 | 7/2005 | Sun |
| 2014/0266630 A1 | 9/2014 | Beckman |

(Continued)

FOREIGN PATENT DOCUMENTS

| CN | 101964047 A | 2/2011 |
| CN | 203458774 U | 3/2014 |

(Continued)

OTHER PUBLICATIONS

"A type of visual anthropomorphic table tennis ball machine", An IP.com Prior Art Database Technical Disclosure, Disclosed Anonymously, IP.com No. IPCOM000254409D, IP.com Electronic Publication Date: Jun. 26, 2018, 4 pages.

(Continued)

*Primary Examiner* — Mahelet Shiberou
(74) *Attorney, Agent, or Firm* — Aaron Pontikos

(57) ABSTRACT

Disclosed are techniques for quantifying physical qualities of a ball returned by a player using a loop drive technique, such as in table tennis, and generating a corresponding quantitative summary of the overall quality of the loop drive technique based on the quantified physical qualities. Image processing techniques are applied to historical video recordings of balls returned using loop drive techniques to quantify physical properties of said balls. A machine learning model is generated using the quantified physical properties to determine relative significance of specific qualities and their corresponding quantified values to the overall quality or success of loop drive techniques, such as in table tennis matches.

18 Claims, 3 Drawing Sheets

(56) References Cited

U.S. PATENT DOCUMENTS

| | | | |
|---|---|---|---|
| 2015/0057111 A1* | 2/2015 | Tremblay-Munger | ..................... G06F 3/0346 473/446 |
| 2015/0100245 A1 | 4/2015 | Huang | |
| 2016/0144260 A1 | 5/2016 | Cohen | |
| 2016/0322078 A1 | 11/2016 | Bose | |
| 2017/0318360 A1 | 11/2017 | Tran | |
| 2018/0322337 A1* | 11/2018 | Marty | ..................... G06T 7/20 |
| 2019/0009133 A1 | 1/2019 | Mettler May | |
| 2020/0184846 A1 | 6/2020 | Zhang | |
| 2022/0161117 A1* | 5/2022 | Jessop | ..................... G16H 50/30 |

FOREIGN PATENT DOCUMENTS

| | | |
|---|---|---|
| CN | 104486591 A | 4/2015 |
| CN | 106621261 A | 5/2017 |
| CN | 110227243 A | 9/2019 |
| WO | 2019202474 A1 | 10/2019 |

OTHER PUBLICATIONS

"An optimized IT subsystem health scoring method through combination of Time series model and traditional Machine Learning model", An IP.com Prior Art Database Technical Disclosure, Disclosed Anonymously, IP.com No. IPCOM000260282D, IP.com Electronic Publication Date: Nov. 9, 2019, 6 pages.

"Cognitive learning assistance", An IP.com Prior Art Database Technical Disclosure, Disclosed Anonymously, IP.com No. IPCOM000256388D, IP.com Electronic Publication Date: Nov. 28, 2018, 9 pages.

"Reinforcement Learning as a Basis for Optimization of Operating Systems", An IP.com Prior Art Database Technical Disclosure, Disclosed Anonymously, IP.com No. IPCOM000256512D, IP.com Electronic Publication Date: Dec. 5, 2018, 9 pages.

"Sports Ball Degradation Time Computation Using Audio-Visual Analysis", An IP.com Prior Art Database Technical Disclosure, Disclosed Anonymously, IP.com No. IPCOM000262451D, IP.com Electronic Publication Date: Jun. 2, 2020, 5 pages.

Blank, et al., "Ball Speed and Spin Estimation in Table Tennis using a Racket-mounted Inertial Sensor", ISWC '17, Sep. 11-15, 2017, 8 pages.

Gu, et al., "Effects of table tennis multi-ball training on dynamic posture control", PeerJ 6:e6262, Jan. 16, 2019, 19 pages, <https://peerj.com/articles/6262/>.

Mahjourian, et al., "Hierarchical Policy Design for Sample-Efficient Learning of Robot Table Tennis Through Self-Play", arXiv:1811.12927v2, Feb. 17, 2019, 100 pages.

Vinyes Mora, Silvia, "Computer Vision and Machine Learning for In-Play Tennis Analysis: Framework, Algorithms and Implementation", Doctoral Thesis, Imperial College London, Oct. 2017, 235 pages.

Xie, et al., "Speed and Spin of 40MM Table Tennis Ball and the Effects On Elite Players", ISBS 2002, pp. 623-626.

Ran, et al., "Machine Learning Augmented Loop Drive Training", U.S. Appl. No. 17/038,535, filed Sep. 30, 2020.

Ran, et al., "Capturing and Quantifying Body Postures", U.S. Appl. No. 17/038,568, filed Sep. 30, 2020.

List of IBM Patents or Patent Applications Treated as Related. Filed Herewith. 2 pages.

\* cited by examiner

CAPTURING AND QUANTIFYING LOOP DRIVE BALL METRICS

BACKGROUND

The present invention relates generally to the field of machine learning, and more particularly to leveraging machine learning to quantify loop drive ball metrics, such as in table tennis.

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so.

Computer vision is an interdisciplinary field which grapples with how computers can be granted the ability to gain high-level understanding from digital images or videos. From an engineering perspective, it seeks to automate tasks that the human visual system can do. Computer vision related to the automatic extraction, analysis and understanding of useful information from a single image or a sequence of images such as an animation or video feed. It involves developing a theoretical and algorithmic basis to achieve automatic visual understanding.

Table tennis, also known as ping-pong and whiff-whaff, is a sport where two or four players hit a lightweight ball, also known as the ping-pong ball, back and forth across a table using small rackets, with one to two players on opposing teams positioned on each side of the table. The game takes place on a hard table surface divided by a net. With an exception for the initial serve, the rules are generally as follows: players must allow a ball played toward them to bounce at least once on their side of the table and must return it so that it bounces on the opposite side at least one time. Points are scored when a player fails to return the ball within the rules. Play is fast and requires quick reactions from the players. Spinning the ball alters the trajectory of the ball and limits an opponent's options, giving the player hitting the ball a great advantage, with topspin and downspin corresponding to forward and backward rotation of the table tennis ball relative to the direction of travel for the table tennis ball. Topspin and downspin alter the trajectory of the ball through a phenomenon known as the Magnus effect. The Magnus effect describes a phenomenon where an object travelling through a volume of gas or fluid is deflected in a manner not present when the object is not spinning, and is explained by the difference in pressure of the volume on opposite sides of the spinning object, with rotational speed of the object affecting the extent of the Magnus effect. The "loop", or "loop drive" is a stroke that generates a lot of topspin (with either the forehand or backhand). Loop varieties include slower, 'spinnier' loops and faster but 'not-as-spinny' loops. The loop style is the most popular playing style in contemporary table tennis with a strategy heavily reliant on the loop drive stroke.

SUMMARY

According to an aspect of the present invention, there is a method, computer program product and/or system that performs the following operations (not necessarily in the following order): (i) receiving a historical loop drive ball return video recording data set, including a plurality of video recordings of historical loop drive ball returns, where a given video recording includes at least one instance of a historical table tennis player returning a table tennis ball with a loop drive technique; (ii) determining, for at least one given video recording of historical loop drive ball returns, a set of metrics and their corresponding quantitative values corresponding to properties of the table tennis ball in the given video recording of historical loop drive ball returns; (iii) building a machine learning model to assign weights to the set of metrics; (iv) receiving a live loop drive ball return video recording data set, including a video recording of a live loop drive ball return, where the video recording of the live loop drive ball return includes at least one instance of a live table tennis player returning a table tennis ball with a loop drive technique; (v) determining a set of metrics and their corresponding quantitative values corresponding to properties of the table tennis ball in the video recording of the live loop drive ball return; and (vi) determining a quantitative loop drive ball return summary value corresponding to properties of the table tennis ball in the video recording of a live loop drive ball return based, at least in part, on the weights assigned by the machine learning model.

BRIEF DESCRIPTION OF THE DRAWINGS

FIG. 5 is a flowchart diagram showing a second embodiment method.

DETAILED DESCRIPTION

Figure 1:
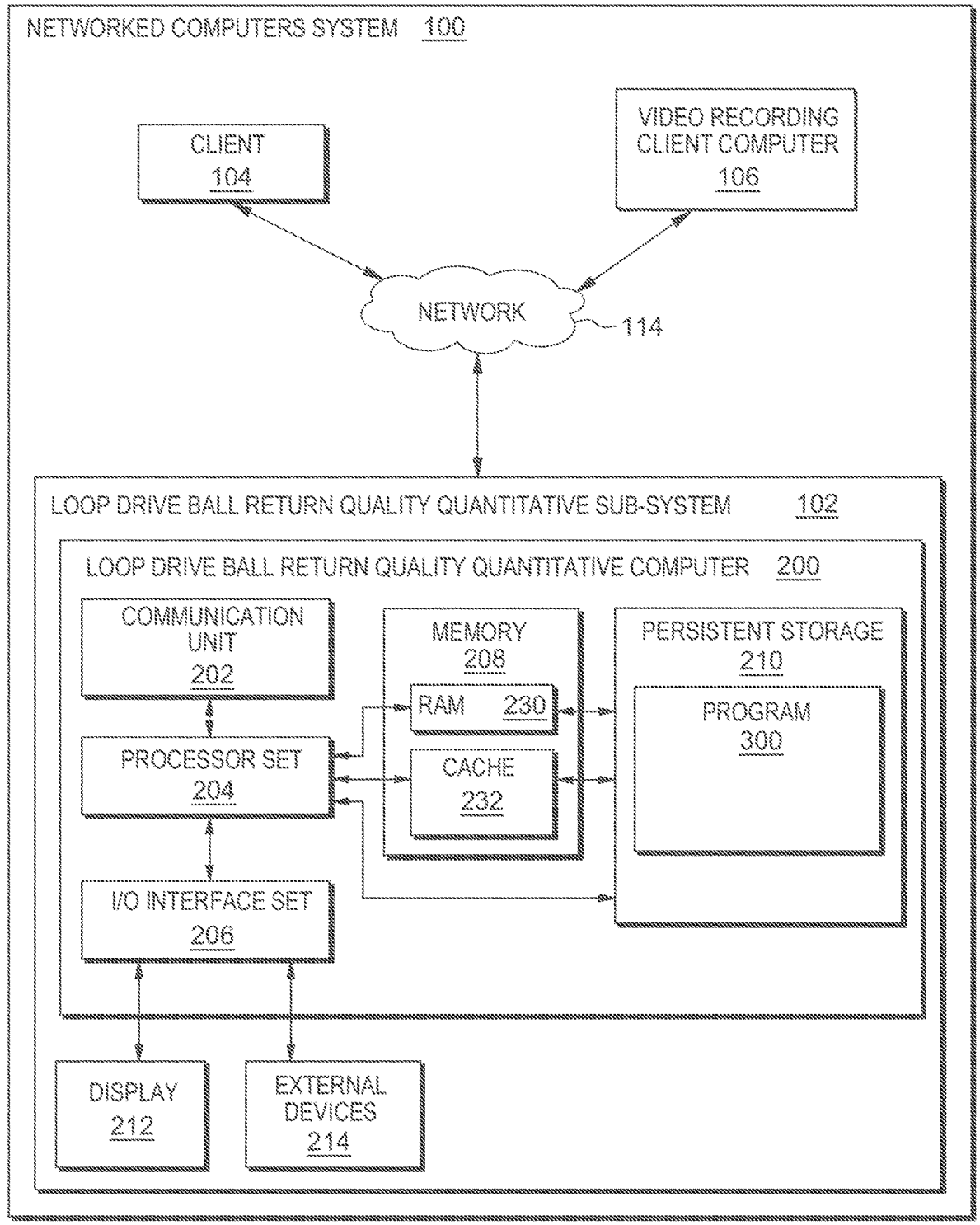
FIG. 1 is a block diagram view of a first embodiment of a system according to the present invention.

Some embodiments of the present invention are directed to techniques for quantifying physical qualities of a table tennis ball returned by a table tennis player using a loop drive technique and generating a corresponding quantitative summary of the overall quality of the loop drive technique based on the quantified physical qualities. Image processing techniques are applied to historical video recordings of table tennis balls returned using loop drive techniques to quantify physical properties of said table tennis balls. A machine learning model is generated using the quantified physical properties to determine relative significance of specific qualities and their corresponding quantified values to the overall quality or success of loop drive techniques in table tennis matches.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, also referred to as machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: loop drive ball return quality quantitative sub-system 102 (sometimes herein referred to, more simply, as subsystem 102); client subsystem 104; video recording client computer 106; and communication network 114. Server subsystem 102 includes: loop drive ball return quality quantitative computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with loop drive ball return quality quantitative computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
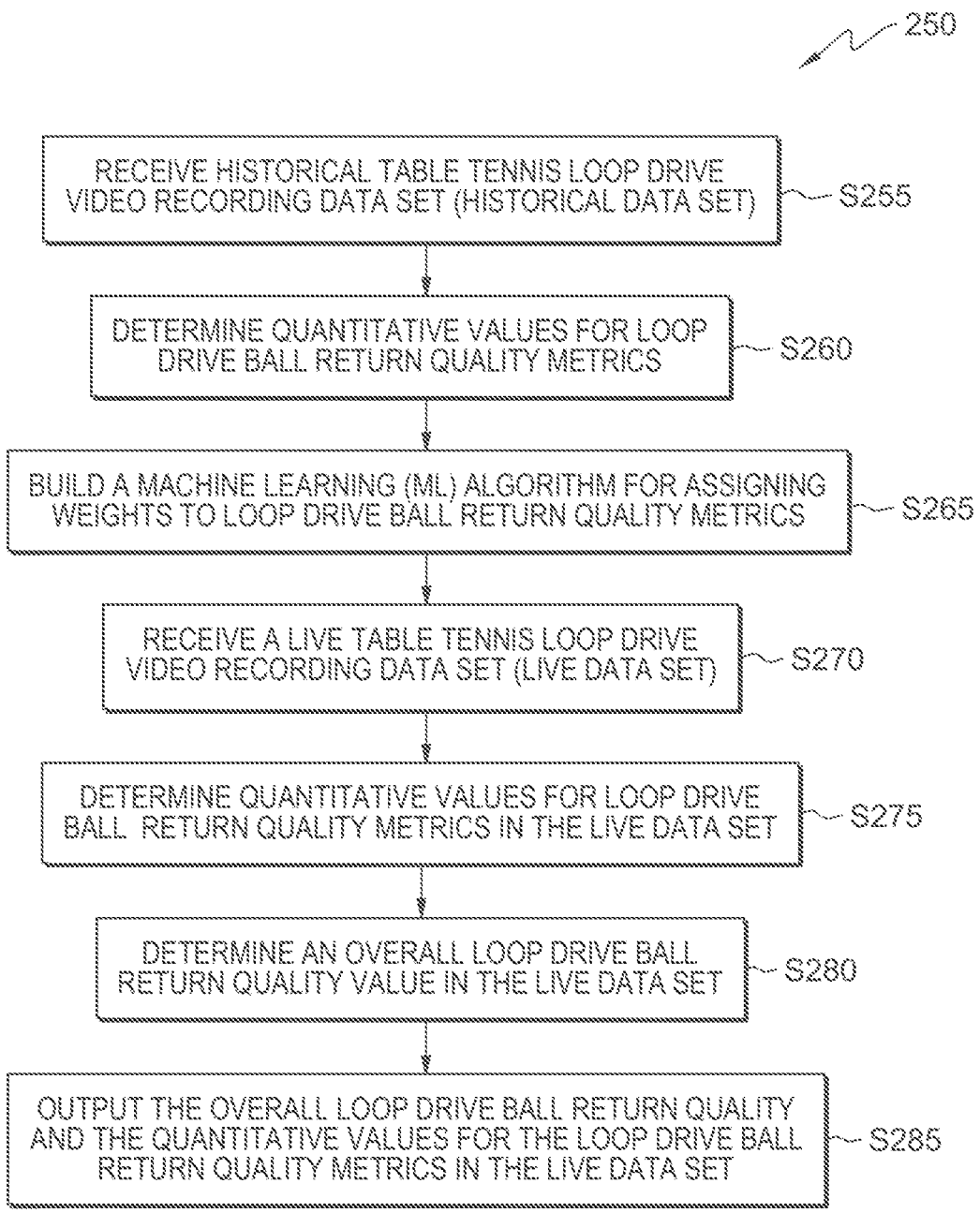
FIG. 2 is a flowchart showing a first embodiment method performed, at least in part, by the first embodiment system.
Figure 3:
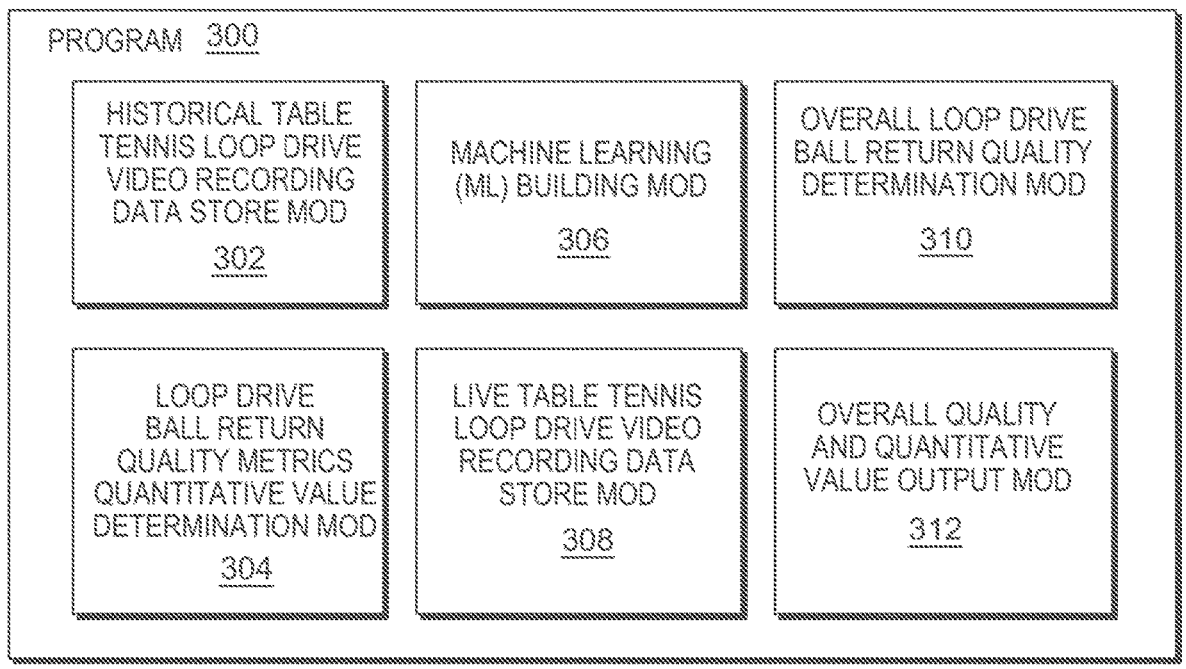
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where historical table tennis loop drive video recording data store module ("mod") 302 receives a historical table tennis loop drive video recording data set (also referred to as the historical data set). In this simplified embodiment, the historical data set includes ten different video recordings, where each video recording observes one instance of a table tennis ball (also referred to as "the ball") being hit with a table tennis racket (also referred to as "the racket") by a first table tennis player (also referred to as "the player"), using a loop drive ball return technique, towards a second table tennis player, bouncing once on a table tennis table (also referred to as "the table"). Each video recording begins upon the cessation of contact between the racket and the ball after the player hit the ball with the racket using the loop drive return technique. Each video recording ends upon the first time the ball begins physical contact with any other surface other than the side of the table corresponding to the second player. In some alternative embodiments, the historical data set includes many more different video recordings.

Processing proceeds to operation S260, where loop drive ball return quality metrics quantitative value determination mod 304 determines quantitative values for loop drive ball return quality metrics. In this simplified embodiment, loop drive ball return quality metrics quantitative value determination mod 304 determines quantitative values for three loop drive ball return quality metrics: (i) topspin rotation of the ball; (ii) distance from the edge of the table corresponding to the second player where the ball physically contacts the table; and (iii) whether or not the loop drive ball return of the player, hitting the ball towards the second table tennis player, would qualify for a scored point in the context of a table tennis match. In this simplified embodiment, the loop drive ball return quality metrics quantitative value determination mod 304 determines these three quantitative values for each of the ten different video recordings in the historical data set. Loop drive ball return quality metrics quantitative value determination mod 304 leverages a computer vision based image processing and pattern recognition technique to analyze each of the ten different video recordings in the historical data set to determine these values, by combing through each frame of a given video recording to determine properties of the ball after it has been hit with the racket by the player. An example determined quantitative values for the loop drive ball return quality metrics includes: (i) 120 rotations per minute (RPM) of topspin; (ii) three inches of distance from the edge of the table; and (iii) scored a point. In some alternative embodiments, quantitative values are determined for at least some of the following loop drive ball return quality metrics: (i) velocity of the ball after contacting the table; and (ii) side spin rotation speed of the ball.

Processing proceeds to operation S265, where Machine Learning (ML) building mod 306 builds a Machine Learning (ML) algorithm for assigning weights to loop drive ball return quality metrics. In this simplified embodiment, an initial set of weights is assigned to the first two loop drive ball return quality metrics, namely, topspin rotation of the ball and distance from the edge of the table corresponding to the second player. The third loop drive ball return quality metric, whether or not the loop drive ball return of the player, hitting the ball towards the second table tennis player, would qualify for a scored point in the context of a table tennis match, is used as an evaluation criteria for the previously mentioned two loop drive ball return quality metrics. Then, iterating through the ten different video recordings, ML building mod 306 builds a ML algorithm to adjust or fine tune the weights based on whether or not the loop drive ball return of the player, hitting the ball towards the second table tennis player, would qualify for a scored point in the context of a table tennis match. This results in a ML algorithm that calculates how much each loop drive ball return quality metric contributes to the loop drive ball return results in a loop drive ball return that would qualify for scoring a point.

Processing proceeds to operation S270, where live table tennis loop drive video recording data store mod 308 receives a live table tennis loop drive video recording data set (also referred to as the live data set). In this simplified embodiment, the live data set includes a single video recording observing one instance of a live table tennis ball (also referred to as "the live ball") being hit with a table tennis racket (also referred to as "the live racket") by a first table tennis player (also referred to as "the live player"), using a loop drive ball return technique, towards a second table tennis player, bouncing once on a table tennis table (also referred to as "the live table"). Each video recording begins upon the cessation of contact between the live racket and the ball after the player hit the ball with the racket using the loop drive return technique. Each video recording ends upon the first time the ball begins physical contact with any other surface other than the side of the table corresponding to the second player.

Processing proceeds to operation S275, where loop drive ball return quality metrics quantitative value determination mod 304 determines quantitative values for loop drive ball return quality metrics in the live data set. In this simplified embodiment, loop drive ball return quality metrics quantitative value determination mod 304 determines quantitative values for three loop drive ball return quality metrics corresponding to the live ball: (i) topspin rotation of the live ball; (ii) distance from the edge of the live table corresponding to the second player where the live ball physically contacts the live table; and (iii) whether or not the loop drive ball return of the player, hitting the ball towards the second table tennis player, would qualify for a scored point in the context of a table tennis match. Loop drive ball return quality metrics quantitative value determination mod 304 again leverages the computer vision based image processing and pattern recognition technique, this time to analyze the video recording in the live data set, by combing through each frame of video recording in the live data set to determine properties of the live ball after it has been hit with the live racket by the live player. For example, in this simplified embodiment, loop drive ball return quality metrics quantitative value determination mod 304 determines quantitative values for three loop drive ball return quality metrics corresponding to the live ball as the following: (i) the topspin rotation of the live ball is 150 RPM; (ii) the live ball bounced off of the live table three inches of distance from the edge of the live table; and (iii) the loop drive ball return of the player, hitting the ball towards the second table tennis player, qualified for a scored point in the context of a table tennis match.

Processing proceeds to operation S280, where overall loop drive ball return quality determination mod 310 determines an overall loop drive ball return quality value in the live data set. In this simplified embodiment, overall loop drive ball return quality determination mod 310 applies the weights determined by the ML algorithm built at S265 to the determined quantitative values in S275 to compare against a set of maximally optimized loop drive ball return quality metrics to synthesize a quantitative value corresponding to an overall loop drive ball return quality for the live data set. For example, if the topspin rotation is assigned a much greater weight than the other loop drive ball return quality metrics, the overall loop drive ball return quality value for the live data set can still be determined as a relatively high value if the topspin rotation of the live ball is relatively high, regardless of however high (or low) the determined quantitative values for the other loop drive ball return quality metrics are. Conversely, in that same example, the overall loop drive ball return quality value for the live data set can be low if the topspin rotation of the live ball is relatively low, regardless of how high the quantitative values are for the other loop drive ball return quality metrics are. In this simplified embodiment, an example quantitative value consists of a numeric rating between zero and one hundred, indicating what percentile of overall loop drive ball returns the live ball fits into in terms of overall loop drive ball return quality.

Figure 4:
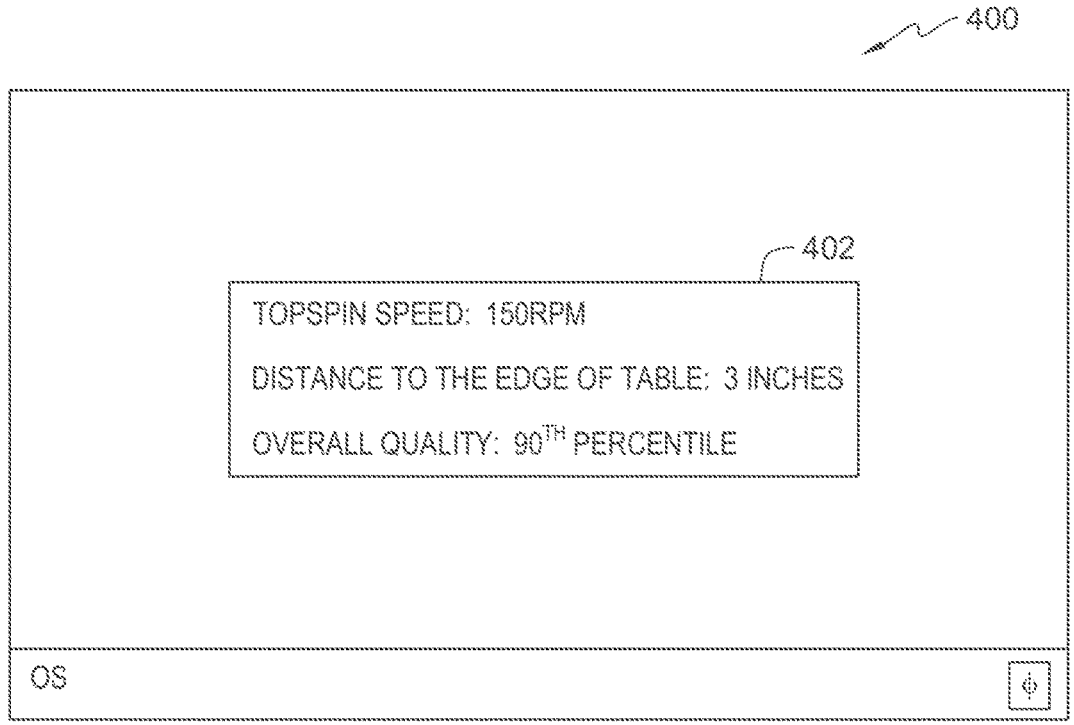
FIG. 4 is a screenshot view generated by the first embodiment system.

Processing proceeds to operation S285, where overall quality and quantitative value output mod 312 outputs the overall loop drive ball return quality value and the quantitative values for the loop drive ball return quality metrics in the live data set. In this simplified embodiment, the determined quantitative values for loop drive ball return quality metrics in the live data set and the determined overall loop drive ball return quality value are output to a display device connected to client 104 of FIG. 1 in the form of a graphical user interface as shown in window 402 of screenshot 400 of FIG. 4. In some alternative embodiments, overall quality and quantitative value output mod 312 outputs the overall loop drive ball return quality value and the quantitative values for the loop drive ball return quality metrics in the live data set in the form of audible emissions from a speaker device connected to client 104 using text-to-speech techniques.

III. Further Comments and/or Embodiments

Some embodiments of the present invention recognize the following facts, potential problems and/or potential areas for improvement with respect to the current state of the art: (i) loop drive is one of the most key and popular techniques in table tennis, and occupies most of a player's time during their training and practice; (ii) thus the acquisition and quantification of the return quality of the ball returned using a loop drive technique is essentially important; (iii) this can be used as a reference for coaches/players to have an accurate understanding about the ball's return quality for loop drive training; (iv) while solutions exist related to devices used for capturing and acquisition of ball kicking performance, there are at least two problems for those solutions; (v) first, there is not a comprehensive and synthetic feature summary for the return quality of the table tennis ball during loop drive training; (vi) and second, there is no accurate and quantitative technique to evaluate the overall return quality of the table tennis ball during loop drive training; and (vii) there is no overall quantitative evaluation of the loop drive ball's return quality.

Some embodiments of the present invention may include one, or more, of the following operations, features, characteristics and/or advantages: (i) generate a synthetic summary about all the features that directly decide the ball's return quality during table tennis loop drive training; (ii) and provide an overall quantitative evaluation of the loop drive ball's return quality; (iii) this quantitative data can then be used as an accurate reference for coaches and players to have a better understanding about the overall loop drive ball's return quality, and help them find out where the player needs to improve their loop drive skills; (iv) for the capturing and acquisition of those quality features quantitative data, leverage mature video and image processing, computer vision methods, etc.; (v) for the calculation of loop drive ball's overall return quality, assign some initial weights for each feature based on the priority order of features (for example, top/down rotation speed is the most important factor that decide the quality of loop drive ball); (vi) then based on whether the loop drive ball scores or not, leverage some ML algorithm to automatically adjust the weight of each feature to be optimal; (vii) a comprehensive and synthetic set of features of loop drive ball's return quality (ball's top rotation speed, side spin speed, movement displacement of the ball's return, etc.) that could directly impact the quality of table tennis loop drive; (viii) a quantitative acquisition system for ball's return quality during loop drive training, which can not only generate specific quality feature's quantitative data, but also can generate an overall quantitative evaluation of the loop drive ball's return quality by leveraging ML algorithm; and (ix) those quantitative data can be used by coaches/players to have a clear understanding about the loop drive ball's return quality.

Some embodiments of the present invention may include one, or more, of the following operations, features, characteristics and/or advantages: (i) first, a video-based 3-D Modeling (i.e. computer vision) technique and video acquisition, processing and pattern recognition technique are chosen; (ii) next, leverage the previously chosen techniques to get/calculate quality metrics for the loop drive ball's return quality data; (iii) first, the top/down rotation speed—the higher top/down rotation speed, the better; (iv) this is the most important feature deciding the ball's return quality; (v) second, the rate of movement of the ball after contacting the table—the higher the rate of movement, the better; (vi) third, the movement displacement along the table of the ball's return before contacting the table—the longer the better; (vii) a longer displacement means that the ball is nearer the edge of the table and more difficult to be handled by an opposing player; (viii) fourth, the side spin speed of the ball—the lower the better; (ix) ideally there should be zero side spin when returning the ball using the loop drive technique; (x) a higher side spin speed means the body/racket postures could be wrong when hitting the loop drive ball; (xi) and fifth, whether the ball's return scores or not—scores means the quality is good; (xii) whether score or not can also be used to automatically adjust the weight the other previously mentioned factors when calculating the overall ball's return quality; (xiii) next, based on the ball's return quality data, do the labeling and classification; (xiv) give initial weights for each feature that contributes to ball's return quality; (xv) based on some feature (i.e. whether the ball scores or not), leverage a specific ML algorithm to automatically adjust the weight and make the weight for each feature optimal; and (xvi) based on the calculated weight for each feature, get the overall quantitative evaluation of the ball's return quality.

Some embodiments of the present invention may include one, or more, of the following operations, features, characteristics and/or advantages: (i) focus on bringing up a comprehensive and synthetic feature summary on the ball's return quality during table tennis loop driving training; (ii)

leverage technologies such as computer vision, 3D modeling, video processing to capture those features; (iii) retrieve corresponding quantitative data; (iv) finally leverage machine learning to setup a quantification system to generate the ball's overall return quality during loop drive training; (v) this can work as some base data to give coaches and players a better understanding on the quality of the loop drive training; (vi) a quantification system to get the ball's overall return quality by leveraging a series of video processing and pattern recognition technologies, machine learning methods, etc., to capture, quantify and analyze ball's return quality features; (vii) for example, topspin/backspin speed, movement displacement of the ball's return, the side spin speed of the ball, and whether the ball's return scores or not, etc.; (viii) finally get an overall score for the ball's return quality; (ix) quantify and calculate table tennis ball's return quality during loop drive training by leveraging video acquisition, processing and recognition method, and machine learning methods, etc., to eventually help players and coaches to have a quantitative understanding about ball's return quality, and accordingly help improve the relevant techniques for loop drive; (x) a comprehensive and synthetic summary of the relevant features (i.e. topspin or backspin speed, the ball rate of movement after contacting the table, the movement displacement of the ball's return, the side spin speed of the ball, the ball scores or not) that directly impacts the ball's return quality during table tennis loop driving training; (xi) leverage a series of technologies like video acquisition, processing and recognition technology, machine learning techniques to calculate and analyze the loop drive ball's return quality; (xii) eventually help player and coaches to improve according techniques based on the ball's return quality quantitative values; (xiii) investigating those features that could directly impact and contribute to the quality of the ball's return, such as topspin or backspin speed, the ball rate of movement after contacting the table, the movement displacement of the ball's return, the side spin speed of the ball, and whether the ball scores or not; and (xiv) then leverage a series of technologies such as video acquisition, processing/recognition, and machine learning techniques to calculate, analyze and quantify the loop drive ball's return quality.

According to an aspect of the present invention, there is a method, computer program product and/or system for quantification of ball return quality data in table tennis loop drive training that performs the following operations (not necessarily in the following order): (i) the ball return quality data include a comprehensive set of features, including top/down rotation speed, movement displacement of the ball's return, the side spin speed of the ball, and whether the ball's return scores or not; (ii) the quantification system not only generates specific quantitative data, but also generates an overall quantitative evaluation of the loop drive ball's return by leveraging machine learning algorithm; and (iii) that can be used by coaches/players to have a clear understanding about the loop drive ball's return quality.

In some embodiments of the present invention, a list of metrics affecting the quality of a table tennis ball returned using a loop drive technique and their corresponding evaluations includes at least some of the following: (i) the top (or down) rotation speed of the ball—the higher the speed the better; (ii) the ball rate of movement (or speed) after contacting the table—the higher the speed the better; (iii) the side spin speed of the ball—the lower the side spin speed better (a higher side spin speed means that the body/racket postures could be incorrect or suboptimal when hitting the loop drive ball—ideally there should be zero side spin when performing the loop drive technique); and (iv) the returned ball scores or not—scoring indicates that the quality is good—whether the ball scores or not can also be used to automatically adjust the weight for the other metrics when determining the overall quality of the returned ball.

Referring to FIG. 5, flowchart 500 shows a second embodiment method according to the present invention and includes the following operations: (i) operation 502; (ii) operation 504; (iii) operation 506; (iv) operation 508; (v) operation 510; (vi) operation 512; (vii) operation 514; and (viii) operation 516.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
receiving a historical loop drive ball return video recording data set, including a plurality of video recordings of historical loop drive ball returns, where a given video recording includes at least one instance of a historical table tennis player returning a table tennis ball with a loop drive technique;
determining, for at least one given video recording of historical loop drive ball returns, a set of metrics and their corresponding quantitative values corresponding to properties of the table tennis ball in the given video recording of historical loop drive ball returns, where the set of metrics includes at least three metrics, where the first metric is topspin rotation of the table tennis ball, the second metric is distance from a table tennis table edge corresponding to an opponent's side of the table tennis table, and the third metric is whether the loop drive ball return qualified as a scoring hit;
building a machine learning model to assign weights to the set of metrics corresponding to the properties of the table tennis ball in a video recording of a live loop drive ball return, where the video recording of the live loop drive ball return includes at least one instance of a live table tennis player returning the table tennis ball with the loop drive technique;
receiving the video recording of the live loop drive ball return;
determining the set of metrics and their corresponding quantitative values corresponding to the properties of the table tennis ball in the video recording of the live loop drive ball return; and
determining a quantitative loop drive ball return summary value corresponding to the properties of the table tennis ball in the video recording of the live loop drive ball return based, at least in part, on the weights assigned by the machine learning model.

2. The CIM of claim 1, further comprising:
outputting the quantitative loop drive ball return summary value.

3. The CIM of claim 2, wherein outputting the quantitative loop drive ball return summary value includes displaying the quantitative loop drive ball return summary value on a graphical user interface of a display device.

4. The CIM of claim 1, wherein outputting the quantitative loop drive ball return summary value includes audibly emitting through a speaker device using a text-to-speech technique.

5. The CIM of claim 1, wherein:
the set of metrics further includes: a fourth and fifth metric, where the fourth metric is velocity of the table tennis ball after contacting the table tennis table, and the fifth metric is side spin rotation speed of the table tennis ball.

6. The CIM of claim 5, wherein:
determining the quantitative loop drive ball return summary value is further based on the corresponding quantitative values of the set of metrics corresponding to the properties of the table tennis ball in the video recording of the live loop drive ball return, where the quantitative loop drive ball return summary value is:
increased corresponding to the topspin rotation speed of the table tennis ball adjusted by the assigned weights,
increased corresponding to the velocity of the table tennis ball after contacting the table tennis table adjusted by the assigned weights,
decreased corresponding to the side spin rotation speed of the table tennis ball adjusted by the assigned weights,
increased corresponding to the distance from the table tennis table edge corresponding to the opponent's side of the table tennis table adjusted by the assigned weights, and
increased corresponding to whether the loop drive ball return qualified as a scoring hit adjusted by the assigned weights.

7. A computer program product (CPP) comprising:
a machine readable storage device; and
computer code stored on the machine readable storage device, with the computer code including instructions for causing a processor(s) set to perform operations including the following:
receiving a historical loop drive ball return video recording data set, including a plurality of video recordings of historical loop drive ball returns, where a given video recording includes at least one instance of a historical table tennis player returning a table tennis ball with a loop drive technique;
determining, for at least one given video recording of historical loop drive ball returns, a set of metrics and their corresponding quantitative values corresponding to properties of the table tennis ball in the given video recording of historical loop drive ball returns, where the set of metrics includes at least three metrics, where the first metric is topspin rotation of the table tennis ball, the second metric is distance from a table tennis table edge corresponding to an opponent's side of the table tennis table, and the third metric is whether the loop drive ball return qualified as a scoring hit;
building a machine learning model to assign weights to the set of metrics corresponding to the properties of the table tennis ball in a video recording of a live loop drive ball return, where the video recording of the live loop drive ball return includes at least one instance of a live table tennis player returning the table tennis ball with the loop drive technique;
receiving the video recording of the live loop drive ball return;
determining the set of metrics and their corresponding quantitative values corresponding to the properties of the table tennis ball in the video recording of the live loop drive ball return; and
determining a quantitative loop drive ball return summary value corresponding to the properties of the table tennis ball in the video recording of the live loop drive ball return based, at least in part, on the weights assigned by the machine learning model.

8. The CPP of claim 7, wherein the computer code further includes instructions for causing the processor(s) set to perform the following operations:
outputting the quantitative loop drive ball return summary value.

9. The CPP of claim 8, wherein outputting the quantitative loop drive ball return summary value includes displaying the quantitative loop drive ball return summary value on a graphical user interface of a display device.

10. The CPP of claim 7, wherein outputting the quantitative loop drive ball return summary value includes audibly emitting through a speaker device using a text-to-speech technique.

11. The CPP of claim 7, wherein:
the set of metrics further includes: a fourth and fifth metric, where the fourth metric is velocity of the table tennis ball after contacting the table tennis table, and the fifth metric is side spin rotation speed of the table tennis ball.

12. The CPP of claim 11, wherein:
determining the quantitative loop drive ball return summary value is further based on the corresponding quantitative values of the set of metrics corresponding to the properties of the table tennis ball in the video recording of the live loop drive ball return, where the quantitative loop drive ball return summary value is:
increased corresponding to the topspin rotation speed of the table tennis ball adjusted by the assigned weights,
increased corresponding to the velocity of the table tennis ball after contacting the table tennis table adjusted by the assigned weights,
decreased corresponding to the side spin rotation speed of the table tennis ball adjusted by the assigned weights,
increased corresponding to the distance from the table tennis table edge corresponding to the opponent's side of the table tennis table adjusted by the assigned weights, and
increased corresponding to whether the loop drive ball return qualified as a scoring hit adjusted by the assigned weights.

13. A computer system (CS) comprising:
a processor(s) set;
a machine readable storage device; and
computer code stored on the machine readable storage device, with the computer code including instructions for causing the processor(s) set to perform operations including the following:
receiving a historical loop drive ball return video recording data set, including a plurality of video recordings of historical loop drive ball returns, where a given video recording includes at least one instance of a historical table tennis player returning a table tennis ball with a loop drive technique;
determining, for at least one given video recording of historical loop drive ball returns, a set of metrics and their corresponding quantitative values corresponding to properties of the table tennis ball in the given video recording of historical loop drive ball returns, where the set of metrics includes at least three metrics, where the first metric is topspin rotation of the table tennis ball, the second metric is distance from a table tennis table edge corresponding to an opponent's side of the table tennis table, and the third metric is whether the loop drive ball return qualified as a scoring hit;
building a machine learning model to assign weights to the set of metrics corresponding to the properties of the table tennis ball in a video recording of a live loop drive ball return, where the video recording of the live loop drive ball return includes at least one instance of a live table tennis player returning the table tennis ball with the loop drive technique,
receiving the video recording of the live loop drive ball return;
determining the set of metrics and their corresponding quantitative values corresponding to the properties of the table tennis ball in the video recording of the live loop drive ball return; and
determining a quantitative loop drive ball return summary value corresponding to the properties of the table tennis ball in the video recording of the live loop drive ball return based, at least in part, on the weights assigned by the machine learning model.

14. The CS of claim 13, wherein the computer code further includes instructions for causing the processor(s) set to perform the following operations:
outputting the quantitative loop drive ball return summary value.

15. The CS of claim 14, wherein outputting the quantitative loop drive ball return summary value includes displaying the quantitative loop drive ball return summary value on a graphical user interface of a display device.

16. The CS of claim 13, wherein outputting the quantitative loop drive ball return summary value includes audibly emitting through a speaker device using a text-to-speech technique.

17. The CS of claim 13, wherein:
the set of metrics further includes: a fourth and fifth metric, where the fourth metric is velocity of the table tennis ball after contacting the table tennis table, and the fifth metric is side spin rotation speed of the table tennis ball.

18. The CS of claim 17, wherein:
determining the quantitative loop drive ball return summary value is further based on the corresponding quantitative values of the set of metrics corresponding to the properties of the table tennis ball in the video recording of the live loop drive ball return, where the quantitative loop drive ball return summary value is:
increased corresponding to the topspin rotation speed of the table tennis ball adjusted by the assigned weights,
increased corresponding to the velocity of the table tennis ball after contacting the table tennis table adjusted by the assigned weights,
decreased corresponding to the side spin rotation speed of the table tennis ball adjusted by the assigned weights,
increased corresponding to the distance from the table tennis table edge corresponding to the opponent's side of the table tennis table adjusted by the assigned weights, and
increased corresponding to whether the loop drive ball return qualified as a scoring hit adjusted by the assigned weights.

* * * * *